United States Patent
Battaglia

[19]

[11] Patent Number: 5,845,429
[45] Date of Patent: Dec. 8, 1998

[54] LAYERED SHEET METAL FISH HOOK

[76] Inventor: Vincent P. Battaglia, 209 Banks Rd., Easton, Conn. 06612

[21] Appl. No.: 938,566

[22] Filed: Sep. 26, 1997

[51] Int. Cl.$^6$ .................................................. A01K 83/00
[52] U.S. Cl. ............................................................ 43/43.16
[58] Field of Search ............................... 43/43.16, 44.82, 43/44.83

[56] References Cited

U.S. PATENT DOCUMENTS 1,421,442  7/1922  Flynn ........................................ 24/908

FOREIGN PATENT DOCUMENTS 57138  of 1944  Netherlands ........................... 43/43.16

*Primary Examiner*—Jack W. Lavinder
*Attorney, Agent, or Firm*—H. Gibner Lehmann; K. Gibner Lehmann

[57] ABSTRACT

A one-piece sheet metal fish hook comprises a member which derives much of its strength from the unique formations of the sheet metal stock. The member has a shank portion, a bill portion connected to one end of the shank portion, and an eye portion connected to the other end of the shank portion. The metal is formed to provide layers or laminations which shape the eye portion, such layers having one set of corresponding edges that are joined by a tight fold. The shank and bill portions are partly of channel cross section and partly of layered or laminated cross section, the latter having corresponding edges which are integrally joined to each other by a tight fold of the metal. The various formations provide for different degrees of strength and rigidity, at desired places.

12 Claims, 1 Drawing Sheet

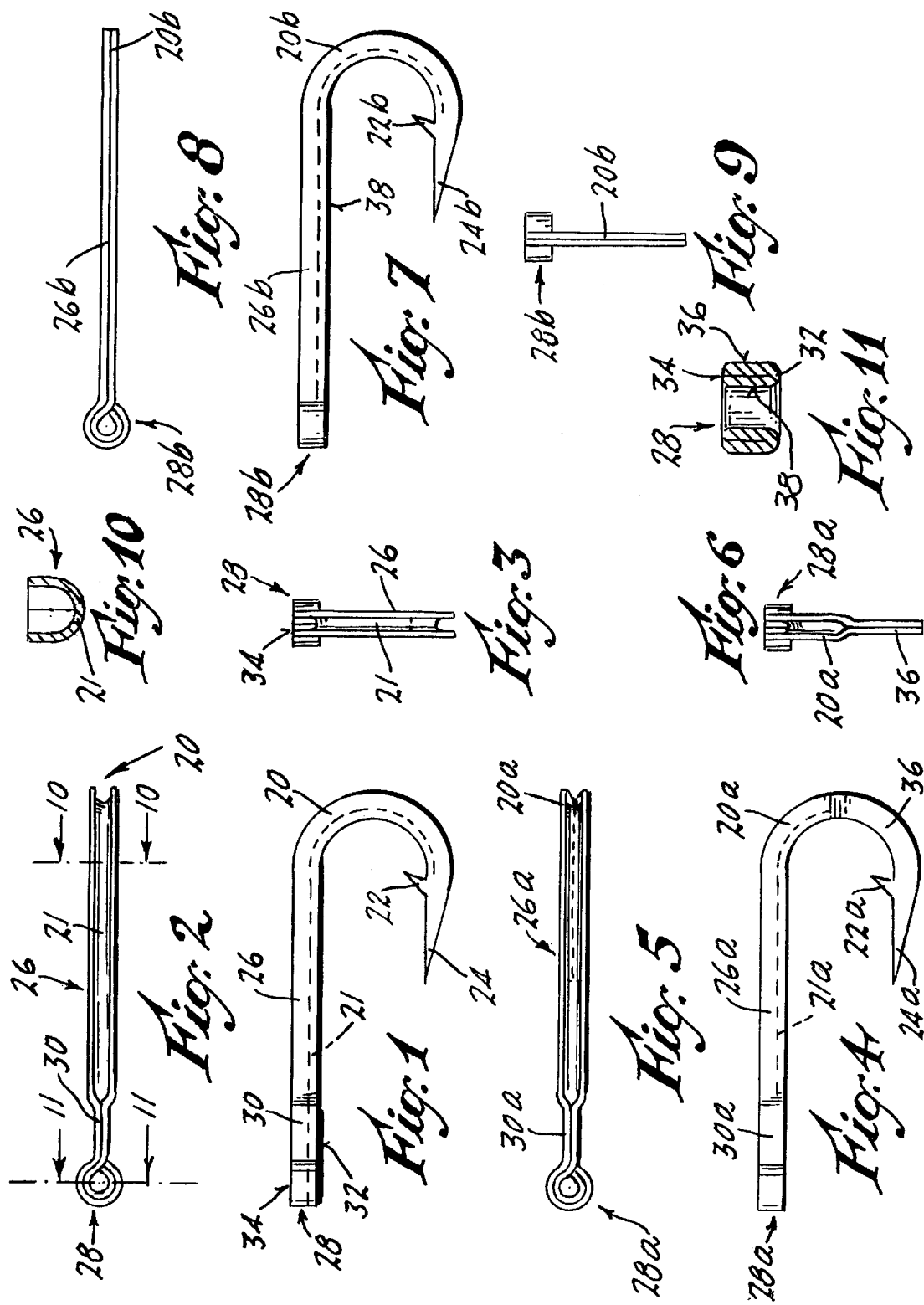

LAYERED SHEET METAL FISH HOOK

CROSS REFERENCES TO RELATED APPLICATIONS/PATENTS

U.S. Application for Letters patent Ser. No. 08/892,452 filed Jul. 14, 1997, entitled "SHEET METAL FISH HOOK" and having common ownership with the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to sheet metal fish hooks, and more particularly to such fish hooks wherein various formations of the sheet metal are utilized to secure the desired strengths and configurations.

2. Description of the Related Art Including Information DISCLOSED UNDER 37 CFR Sections 1.97–1.99

The following prior art references are hereby cited as being of interest in the field to which the present invention pertains:

U.S. Pat. Nos.:

| | | |
|---|---|---|
| 3,564,749 | 4,060,928 | 4,028,838 |
| 5,537,774 | 2,501,210 | 2,841,914 |

Norwegian Patent No. 93,059

Norwegian Patent No. 93,059 discloses a fish hook formed from an elongate narrow straight strip of sheet metal which has been first twisted into a screw configuration and thereafter formed into the shape of a fish hook. A number of distinct and separate operations is involved in the formation of this hook, resulting in labor and handling costs which make the hook expensive to fabricate. The final configuration of the hook also results in certain limitations as to its usefulness in different situations and environments.

U.S. Pat. No. 2,501,210 discloses a composite fish hook having a swivel-mounted spring-charged barb arm in a latch arrangement that is released when the angler pulls on a short piece of line that is disposed at the shank of the hook. This is a costly, semi-automatic mechanism which is also susceptible to snagging of the parts, and the patent makes no reference to the production of low-cost fish hooks.

U.S. Pat. No. 2,841,914 relates to barbless fish hooks which are easy to disengage from caught fish, enabling the same to be returned uninjured to the water. No mention is made of reducing costs, eliminating labor, etc. to bring down the price of the hooks.

U.S. Pat. No. 3,564,749 relates to fish hooks which are formed from stamped metal blanks. However, these fish hooks require secondary operations to be performed on the blanks after the initial stamping of the same, and such operations entail labor and additional tooling and handling which introduces high cost factors whereby the ultimate price of the fish hooks cannot compare with the price of fish hooks which are machine-produced to their final configuration, except for add-ons such as lures, weights and the like.

U.S. Pat. No. 4,028,838 reveals various fish-hook configurations characterized by constricted throat sections as distinguished from reverse-acting barbs, whereby improved holding power is had without the use of barbs that complicate the removal of the hook and increase damage to the fish. Nothing is disclosed with respect to reduction in cost, or elimination of labor, or automatic machine production.

U.S. Pat. No. 4,060,928 is directed to the provision of fish hooks that are caused to rotate within a fish's mouth, thereby to prevent hooking the fish in the soft side portion of the mouth. The hooks of this patent are also intended for use with artificial worms whereby the worms move through the water without twisting of the lines. No object is mentioned, regarding reduction of the cost of the hooks, or high production-low labor techniques.

Finally, U.S. Pat. No. 5,537,774 reveals the use of a swivel ball mounting or coupling for fish-hooks, to enable rotation of the hooks to attract fish as the hook is pulled through the water. There is no disclosure of metal stamping of fish hooks to achieve high production, elimination of labor, and lower costs.

SUMMARY OF THE INVENTION

The above disadvantages and drawbacks of prior fish hooks are obviated by the present invention, and accordingly one object of the invention is to provide a novel and improved fish hook which is especially simple in its structure and inexpensive to fabricate, thereby rendering it particularly economical from the manufacturing standpoint.

A related object of the invention is to provide an improved fish hook as above set forth, which can be formed largely by automated machinery, thereby minimizing labor costs to the greatest degree possible.

Still another object of the invention is to provide an improved fish hook in accordance with the foregoing, which is sturdy in construction and reliable in operation.

Yet another object of the invention is to provide an improved fish hook of the kind indicated, which is devoid of sharp edges at the location of the eye, thereby eliminating the possibility of frayed or broken fish lines.

Another object of the invention is to provide an improved fish hook as above described, which is readily degradable and susceptible to fast deterioration or rusting, in the event that a broken line inadvertently allows a fish to escape with the hook still in its mouth.

A still further object of the invention is to provide an improved fish hook in accordance with the above, which is adaptable to various strength requirements, and sizes or shapes.

Other features and advantages will hereinafter appear.

BRIEF DESCRIPTION OF THE DRAWINGS

In the accompanying drawings:

FIG. 1 is a plan view, greatly enlarged, of a fish hook made in accordance with the invention.

FIG. 2 is a side edge elevational view of the fish hook of FIG. 1.

FIG. 3 is an end elevational view of the fish hook.

FIG. 4 is a plan view, greatly enlarged, of a fish hook illustrating another embodiment of the invention.

FIG. 5 is a side elevational view of the fish hook of FIG. 4.

FIG. 6 is an end elevational view of the fish hook of FIG. 4.

FIG. 7 is a plan view, greatly enlarged, of a fish hook illustrating yet another embodiment of the invention.

FIG. 8 is a side elevational view of the fish hook of FIG. 7.

FIG. 9 is an end elevational view of the fish hook of FIG. 7.

FIG. 10 is a transverse section of the fish hook of FIG. 2, taken on the line 10—10 of FIG. 2, and FIG. 11 is a transverse section taken on the line 11—11 of FIG. 2.

DETAILED DESCRIPTION OF PREFERRED EMBODIMENTS

Referring first to FIGS. 1–3, 10 and 11, the improved form-strengthened fish hook of the present invention is shown as being constituted of a single piece of thin sheet metal, preferably steel, which is initially in the soft state and of flat stock. The flat sheet stock is blanked by suitable tools, and a configuration is worked up from the blank, to produce a channel shape whose cross section is illustrated in FIG. 10.

The channelled piece thus created if it were laid out straight, would have a linear dimension or straight length which would be approximately that of the outline illustrated in FIG. 1 if the eye portion were to be opened up and made flat, but with the dimension reduced to take into consideration the initial enlargement that was made in the drawings for clarity of illustration.

In creating the channel formation, a bill portion 20 is formed, preferably with the web 21 of the channel at the inside of the curvature as indicated by the dotted line in FIG. 1. The bill portion 20 has a barb 22 and a sharp point 24.

According to this invention, increased strength is had at the free end of the shank 26, which includes the eye 28, this being accomplished by flattening a portion 30 of the shank 26 which connects to the eye 28 and taking advantage of the strength afforded by a tight fold of the metal, which squeezes closed the web 21 of the channel. In FIG. 10 the normal curvature of the web 21 before it is squeezed is clearly indicated.

In FIGS. 1 and 11, the tight fold formed in the flattened shank portion 30 and eye 28 is designated by the numeral 32. Referring to FIG. 2, the eye 28 can be shaped around a mandrel to produce the circular concentric configuration shown.

The increased strength in the eye 28 is also obtained by the forming of the eye 28 from the tightly-folded metal that comprises the shank portion 30 after the latter has first been flattened, whereby the eye is thus constituted of inner and outer concentric layers of the sheet metal, joined together by the tight fold 32, see FIG. 11, along one pair of corresponding side edges.

Referring again to FIG. 11, it is seen that in accordance with the invention all edges of the eye 28 are rounded to prevent fraying of the fish line. The edge formed by the fold 32 has inherent roundness by virtue of the web 21 having been flattened. The opposite edge can be rounded by various types of tooling. According to the invention such rounding is preferably done when the metal is in the flat state indicated at 30, before the bending which forms the eye.

When the portions of the hook are unconfined and in the shape of a channel, as with the shank 26, the strength and rigidity are dictated by the channel configuration as well as the metal thickness, hardness, and composition. When the shank is flattened to form the portion 30 the above characteristics become altered to an extent, because the portion 30 is now layered or laminated with one set of corresponding edges joined by the tight fold 32. At this fold, the metal has been caused to flow or stretch considerably, and can work harden to a greater extent than it does in the forming of the channel web 21, where any flowing or stretching of the metal is more moderate.

The provision of the flattened portion 30 of the shank 26 makes it easier to round off the two sharp edges thereof before forming the eye 28, thereby to obtain the composite rounded edge indicated at 34 in FIG. 11.

With the above construction there is thus obtained in a simple manner, both the elimination of sharp edges and the necessary strength of the eye 28. As presently understood, this is the advantage resulting from the layering or lamination structure, as distinguished from an open channel configuration.

As seen in FIG. 11, the outer layer of the eye 28 has an expansive surface 36 and the inner layer of the eye has an expansive surface 38.

Another embodiment of the invention is illustrated in FIGS. 4, 5 and 6, wherein similar characters of reference but with the suffix "a" are used to designate like elements. In these figures a major part 36 of the bill portion 20a of the fish hook is flattened while the remainder of the bill portion and the shank 26a of the hook retain the channel configuration. The eye 28a is similar to the eye 28. The characteristics of flexibility coupled with strength are had at the hook end of the fish hook, with such construction. Also, ease is had in the formation of the sharp point 24a and the barb 22a.

Still another embodiment of the invention is shown in FIGS. 7, 8 and 9, wherein the eye 28b is similar to the eye 28 of FIGS. 1–3. In this embodiment, not only is the entire shank 26b of layered or laminated construction, with the layers thereof joined by a tight fold 38, but the bill portion 20b is also of laminated configuration. The flexibility and strength of a two-layer shank characterized by the tight fold 38 along one set of coextensive edges is had, as can be understood.

It will now be seen that I have provided unique one-piece fish hook constructions constituted of sheet metal stock, which can be economically produced in large quantities by machine tools, and which have the requisite strength characteristics. The non-round cross sections facilitate the tying of flies and other lures to the hooks, and various strengths can be predetermined to meet various requirements of use.

Variations and modifications of the invention are possible within the scope of the disclosure, and portions of the improvements can be used without others.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A fish hook comprising, in combination:
   a) a formed sheet metal member having generally the configuration of a hook,
   b) said member comprising a shank portion, a bill portion connected to one end of the shank portion, and an eye portion connected to the other end of the shank portion,
   c) said eye portion being constituted of inner and outer layers of said sheet metal, said layers each having two opposite expansive surfaces with the outer layer having its two opposite expansive surfaces disposed one concentrically inside of the other and said outer layer being wrapped around the inner layer so as to be concentric therewith, the inner expansive surface of the outer layer being in contact with the outer expansive surface of the inner layer, d) said sheet metal layers being integral with each other and being joined together by a tight fold along one pair of corresponding edges thereof.

2. A fish hook as set forth in claim 1, wherein said eye portion has rounded edges to prevent fraying of the fish line.

3. A fish hook as set forth in claim 2, wherein said eye portion is fully closed and has a substantially circular opening to receive the fish line.

4. A fish hook as set forth in claim 1, wherein said shank and bill portions have channeled cross sections.

5. A fish hook as set forth in claim 1, wherein:

a) the shank portion has a channeled cross section, b) said bill portion comprises upper and lower layers of said sheet metal, c) said sheet metal layers being integral with each other and being joined together by a common fold along one pair of corresponding edges thereof.

6. A fish hook as set forth in claim 1, wherein:

a) the bill and shank portions comprise upper and lower layers of said sheet metal, b) said sheet metal layers being integral with each other and being joined together by a common fold along one pair of corresponding edges thereof.

7. A fish hook as set forth in claim 1, wherein:

a) said bill portion has a channeled cross section, b) said shank portion comprises upper and lower layers of said sheet metal, c) said sheet metal layers being integral with each other and being joined together by a common fold along one pair of corresponding edges thereof.

8. A fish hook comprising, in combination:

a) a formed sheet metal member having generally the configuration of a hook, b) said member comprising a shank portion, a bill portion connected to one end of the shank portion, and an eye portion connected to the other end of the shank portion, c) said shank, bill and eye portions being respectively tightly folded over and integral with each other, and d) said folded-over eye portion being of inner and outer sheet metal layers of tightly layered cross section, said sheet metal layers thereof being integral with each other, said layers each having two opposite expansive surfaces with the outer layer having its two expansive surfaces disposed concentrically one inside of the other and said outer layer being tightly wrapped around the inner layer so as to be concentric therewith, the inner expansive surface of the outer layer being in contact with the outer expansive surface of the inner layer.

9. A fish hook as set forth in claim 8, wherein the bill portion of the fish hook is tightly folded over and of layered cross section.

10. A fish hook as set forth in claim 9, wherein the layers of the bill portion of the hook are joined together by a common tight fold along one pair of corresponding edges thereof.

11. A fish hook as set forth in claim 8, wherein the shank portion of the hook is tightly folded over and of layered cross section.

12. A fish hook as set forth in claim 11, wherein the layers of the shank portion of the hook are joined together by a common tight fold along one pair of corresponding edges thereof.

* * * * *